United States Patent

[11] 3,573,371

[72] Inventors John T. Carbone
Englishtown, N.J.;
George Parker, New York, N.Y.
[21] Appl. No. 786,118
[22] Filed Dec. 23, 1968
[45] Patented Apr. 6, 1971
[73] Assignee Bell Telephone Laboratories, Incorporated
Murray Hill, N.J.

[54] DIRECT-CURRENT DATA SET ARRANGED FOR POLAR SIGNALING AND FULL DUPLEX OPERATION
6 Claims, 1 Drawing Fig.

[52] U.S. Cl. .......... 178/60
[51] Int. Cl. .......... H04l 5/14
[50] Field of Search .......... 178/49, 58, 59, 60; 333/11, 7; 179/2 (DP)

[56] References Cited
UNITED STATES PATENTS

| | | | |
|---|---|---|---|
| 1,766,919 | 6/1930 | Milnor et al. | 178/60 |
| 2,439,651 | 4/1948 | Dome | 333/7 |
| 2,904,677 | 9/1959 | Heidester | 333/7 |
| 3,493,875 | 2/1970 | Stuckert | 307/235 |

*Primary Examiner*—William C. Cooper
*Assistant Examiner*—David L. Stewart
*Attorneys*—R. J. Guenther and Kenneth B. Hamlin

ABSTRACT: The direction and magnitude of the cumulative polar loop currents on a full duplex two-wire line are monitored by an impedance network which is connected across the signal battery transmitter, the line loop and the line monitor in a manner which enables the monitor to detect incoming marking and spacing currents. The network is arranged to balance or cancel out ground or longitudinal currents that the line loop might apply across the monitor. The application of outgoing signal currents across the monitor is compensated by diodes which alternatively remove or insert impedances in opposing branches of the network when marking or spacing signals are being locally generated.

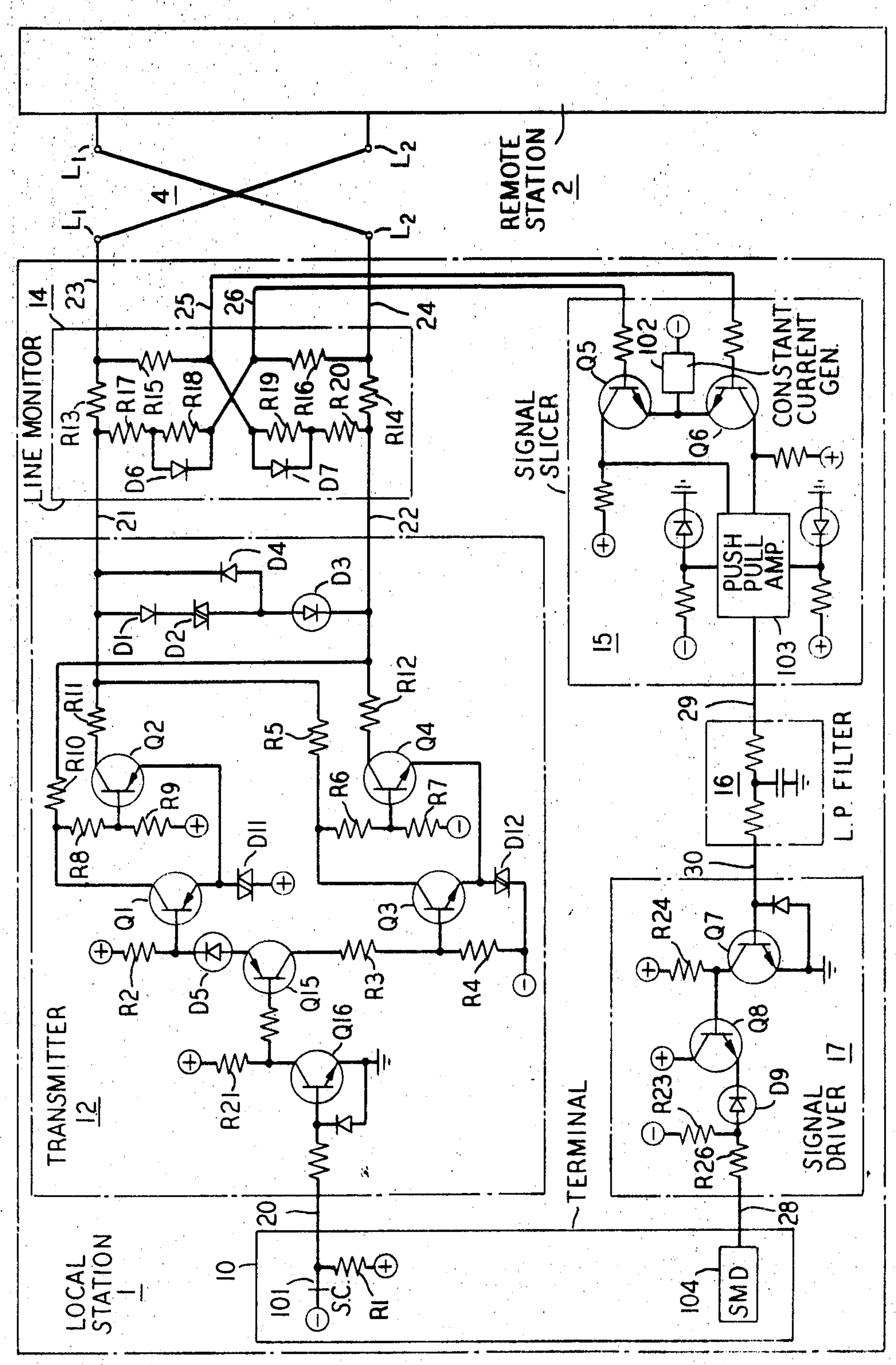
INVENTORS J. T. CARBONE
G. PARKER
BY R C Lipton
ATTORNEY

DIRECT-CURRENT DATA SET ARRANGED FOR POLAR SIGNALING AND FULL DUPLEX OPERATION

FIELD OF THE INVENTION

This invention relates to full duplex polar loop signaling over two-wire lines and, more particularly, to data sets arranged for direct-current polar signaling and full duplex operation.

DESCRIPTION OF THE PRIOR ART

Low speed data sets communicating over short and medium haul telephone lines may employ voice frequency or direct-current signaling techniques. The direct-current signaling can involve alternate current-no-current signals or polar current signals, the latter technique being produced through reversal of a signaling battery wherein current circulates in one direction, such as clockwise, around the two-wire loop of the telephone line when marking current is being transmitted and circulates in the other direction when spacing current is being transmitted. This type of signaling is attractive for medium haul loops since the data sets do not require expensive reactive components necessary for voice transmission or do not require the high current signals, which develop crosstalk, necessary for on-off type signaling.

The power supply of each data set is normally returned to earth ground at its own locality. It is well known that there may exist a potential difference between grounds creating a longitudinal current which flows along each leg of the telephone line from one data set to the other. Because the telephone line is balanced the flow is equal in each leg. Since signal current is loop current while ground current flows longitudinally, the longitudinal current adds to the loop current in one leg and subtracts, by an equal amount, in the other leg. Since polar signaling provides low current levels, longitudinal current can significantly reduce the signaling current in one wire of the loop.

To recover the polar current signals on the two-wire loop, each data set may utilize a monitor which detects the magnitude and direction of the current on each wire. The direction of the circulating current flow on each leg is compared or summed to obtain the direction of the circulating current in the loop and, to thus determine the signal applied thereto. In addition, the magnitude of the circulating current on each leg may be monitored and summed to detect whether the signal level falls below a permissible threshold. Since, for either function, the incoming current on one leg is summed with the outgoing current on the other leg, longitudinal current is effectively canceled out. One arrangement for recovering signals in this manner is disclosed in the copending application of J. T. Carbone, O. F. Gerkensmeier and G. Parker, Ser. No. 566,564, which was filed on Jul. 20, 1966, and which has matured into U.S. Pat. No. 3,505,475.

If full duplex signaling is provided on the line, the magnitude for the battery supply providing spacing current exceeds the magnitude for the battery supply providing marking current, in accordance with one form of the practice. Thus, when one set is sending spacing and the other is sending marking, the spacing current overcomes the opposing marking current and the direction of the circulating current indicates that a spacing signal is being applied to the line. When both sets are sending spacing, the two currents are aiding and the magnitude of the spacing current is over twice the magnitude of the current which circulates when only one set sends spacing. It is obvious that the determination of the direction and magnitude of the circulating current is inadequate for recovering polar signals where full duplex signaling is provided.

It is also well known to utilize a bridge circuit interconnecting the transmitter, line loop and monitor receiver to recover incoming signals on full duplex lines, while balancing out the outgoing signaling currents and the longitudinal currents. These arrangements require careful matching of the impedance of one leg, called an artificial line, with the line loop which forms an opposing leg in order to balance out the locally generated signals. The impedances of line loops are subject to daily change, however, depending on various factors such as weather conditions. It is, therefore, desirable to employ networks which do not require daily adjustment.

SUMMARY OF THE INVENTION

It is, therefore, an object of this invention to recover incoming polar current signals on a full duplex line and cancel or eliminate longitudinal currents.

It is another object of this invention to eliminate the necessity for networks that require adjustment to balance out locally generated signals and longitudinal currents.

The present invention contemplates the provision of an impedance network connected across the data set transmitter, the line loop and the line monitor. The network is symmetrical with respect to the line loop and may be viewed, with respect to the loop, as a bridge circuit which balances out longitudinal currents. The network may also be viewed as a summing setwork, comparing the line current in each wire of the loop, and therefore cancelling out the longitudinal current. In either event, the incoming signal may now be recovered from the cumulative line signal currents by compensating for the locally generated signal.

It is a feature of this invention that compensation for locally generated signal currents is provided by modifying the impedances in the impedance network in accordance with the outgoing signal being generated. Specifically, the network includes diodes in opposing branches which are biased by the local signal battery to insert or remove impedances depending upon the polarity of the battery. Increased impedance is thus inserted in the branches when spacing current, for example, is being applied to the line.

BRIEF DESCRIPTION OF THE DRAWING

The foregoing and other objects and features of this invention will be fully understood from the following description of an illustrative embodiment taken in conjunction with the accompanying drawing which discloses the details of circuits and equipment which cooperate to form a full duplex polar signaling system in accordance with the invention.

GENERAL DESCRIPTION

A specific arrangement for employing the present invention may comprise two stations, such as local station 1, and an identical remote station, generally indicated by block 2 in the drawing. The stations communicate with polar DC current by way of communication line 4, which, as shown in the drawing, comprises two metallic leads. Other communication media, of course, may be used that can accommodate polar signaling.

With respect to the arrangement shown in the drawing, each station sends a marking signal by applying current to line 4 by way of its corresponding terminal L1, which current returns via the remote station and line 4 to its terminal L2. Each stations sends a spacing signal by applying current to line 4 via its corresponding terminal L2, with the return current from the remote station being applied to terminal L1.

When both stations are sending marking signals a voltage source at each station develops the current which is passed to its corresponding terminal L1. These marking voltages are in series and poled in the same direction and the marking currents are, therefore, aiding.

If one station is sending a spacing signal while the other station is transmitting a marking signal, the station sending the spacing signal provides a voltage reversal, which voltage is preferably three times the magnitude of the marking voltage. The spacing current is, therefore, opposing the marking current from the other station and, since this spacing current is developed by a voltage three times the magnitude of the marking voltage, the net result is a reversal of current which flows from terminal L2 of the station sending the spacing signal to terminal L1 of the station sending the marking signal and then, by way of terminal L2 of the latter station, back to terminal L1 of the former station.

In the event that both stations are sending spacing signals, the signal voltages at both stations are reversed, whereby aiding spacing current flows from the L2 terminal of each station to the L1 terminal of the other station. This aiding current is three times the magnitude of the spacing current developed when one station is sending a spacing signal and the other station a marking current.

Consider now local station 1. The station generally includes a customer provided terminal or teletypewriter with appropriate interface circuitry, generally indicated by block 10 in the drawing, a transmitter 12, a line monitor 14, a signal slicer 15, a low-pass filter 16 and a signal driver 17.

Outgoing signals are generated by terminal 10. These signals are applied by way of lead 20 to transmitter 12. Terminal 10 also examines incoming signals applied to lead 28 and records the incoming data in accordance with the signals received on lead 28. When terminal 10 is generating a marking signal, it applies to lead 20 a voltage negative with respect to ground, which negative potential is, of course, passed to transmitter 12. If terminal 10 is generating a spacing signal, lead 20 has applied thereto a voltage positive with respect to ground.

Transmitter 12 responds to the signals from terminal 10 by applying voltage signals across output leads 21 and 22. In response to the negative marking signal on lead 20, transmitter 12 renders the potential on output lead 21 positive with respect to output lead 22. If the remote station is also sending a marking signal, this provides a current flow from transmitter 12 through lead 21, line monitor 14 and lead 23 to terminal L1. The return current flow then passes from terminal L2 through lead 24, line monitor 14 and lead 22 back to transmitter 12. If remote station 2 is sending a spacing signal while transmitter 12 is sending a marking signal, the spacing voltage overcomes the marking voltage provided by transmitter 12, whereby spacing current flows into terminal L1 and out of terminal L2 even though transmitter 12 has rendered lead 21 positive with respect to lead 22.

If terminal 10 is sending a spacing signal, the positive spacing potential applied to lead 20 and passed to transmitter 12 operates to render the potential on output lead 22 positive with respect to output lead 21. If remote station 2 is at this time sending a marking signal, the potential provided by transmitter 12 in sending the spacing signal overcomes the remotely generated marking potential, whereby spacing current flows from transmitter 12 through lead 22, line monitor 14 and lead 24 to terminal L2. The returning spacing current flows into terminal L1 and then by way of lead 23, line monitor 14 and lead 21 back to transmitter 12. Of course, as previously described, if the remote station is sending a spacing signal, the two spacing voltages are in aiding relationship and the resultant current flow over line 4 has a magnitude which is over twice the magnitude of the spacing current flow when only one station is sending a spacing signal.

Line monitor 14 functions to sense the direction and the magnitude of the line current flowing therethrough. In addition, line monitor 14 compensates or balances out any ground currents developed by the differences of ground potentials between the two stations. These two functions are provided in a manner described in detail hereinafter.

In the event that marking current is flowing through line monitor 14, the monitor develops a potential on output lead 26 which is positive with respect to the potential on output lead 25. When spacing current is flowing through line 4 due to the transmission of a spacing signal by local station 1, line monitor 14 similarly renders the potential on output lead 26 positive with respect to the potential on output lead 25 in the event that remote station 2 is sending a marking signal. In the event, however, that transmitter 12 is sending a marking signal and remote station 2 is sending a spacing signal, line monitor 14 responds to the spacing current passing therethrough by rendering the potential on lead 25 positive with respect to the potential on lead 26. Finally, when both stations are sending spacing signals, line monitor 14 detects the increased magnitude of spacing current passing therethrough and similarly renders the potential on lead 25 positive with respect to the potential on lead 26. Accordingly, line monitor 14 provides a relatively positive potential to lead 26 when remote station 2 is sending a marking signal and provides a relatively positive potential to lead 25 when remote station 2 is sending a spacing signal, regardless of the signal concurrently being generated by transmitter 12 at local station 1.

Output leads 25 and 26 of line monitor 14 extend to signal slicer 15. Signal slicer 15 functions to compare the potentials on leads 25 and 26. In the event that the potential on lead 25 is more positive than the potential on lead 26, signal slicer 15 passes a negative potential to output lead 29. Conversely, if the potential on lead 26 is more positive than the potential on lead 25, signal slicer 15 passes a positive potential to lead 29. Accordingly, the potential on lead 29 is positive in response to an incoming marking signal from remote station 2 and is negative in response to an incoming spacing signal from remote station 2. These marking and spacing signals are passed by way of low-pass filter 16 to lead 30. The function of low-pass filter 16 is to filter out any high frequency noise and line transients.

The positive marking and negative spacing signals on lead 30 are applied to signal driver 17. Signal driver 17, in response thereto, shapes or squares up and inverts the signals and applies them to lead 28. Accordingly, lead 28 has applied thereto negative marking signals and positive spacing signals corresponding to the positive marking and negative spacing signals passed to lead 30. These negative marking and positive spacing signals are then applied to terminal 10, which, as previously described, thereupon records the data in accordance with the incoming signals on lead 28.

DETAILED DESCRIPTION

Refer again to terminal 10. During the interval when the marking signal is transmitted negative battery is applied to lead 20, as previously described. As seen in terminal 10, this negative battery is passed by way of send contacts 101. Conversely, when a spacing signal is transmitted, send contacts 101 open, the negative battery is removed and positive battery is applied via resistor R1 to lead 20. These signals are then passed to the base of transistor Q16 to transmitter 12.

Assume now that a marking signal is being transmitted. The negative potential on lead 20 which is passed to the base of transistor Q16 turns the transistor OFF. The potential on the collector of transistor Q16 thereupon rises due to positive battery applied by way of resistor R21. This potential is applied to the base of transistor Q15, turning OFF the latter transistor. With transistor Q15 turned OFF, positive battery is applied via resistor R2 to the base of transistor Q1 and negative battery is applied by way of resistor R4 to the base of transistor Q3. Thus, transistors Q1 and Q3 are turned OFF when terminal 10 is sending marking.

With transistor Q1 turned OFF, the potential at its collector drops below the level of the potential at its emitter, which emitter is connected to positive battery by way of reversely poled diodes D11. As seen in the drawing, the emitter of transistor Q1 is connected to the emitter of transistor Q2. The base of transistor Q2 is connected to the junction of resistors R8 and R9, which, in turn, are arranged as a voltage divider connected between the collector of transistor Q1 and positive battery. It is thus seen that with the drop in potential on the collector of transistor Q1, the potential on the base of transistor Q2 similarly drops to turn ON the latter transistor.

Similarly, the emitter of transistor Q3 is connected to the emitter of transistor Q4 and the base of transistor Q4 is connected to the junction of resistors R6 and R7, which resistors are arranged as a voltage divider between the collector of transistor Q3 and negative battery. Thus, with transistor Q3 turned OFF, transistor Q4 is turned ON. Accordingly, when local station 1 is sending a marking signal transistors Q1 and Q3 are turned OFF and transistors Q2 and Q4 are turned ON.

Since transistors Q2 and Q4 are turned ON, a current path is provided from positive battery through reversely poled diodes D11, the emitter-to-collector path of transistor Q2, resistor R11, diode D1, reversely poled diodes D2, breakdown diode D4, resistor R12, the collector-to-emitter path of transistor Q4 and reversely poled diodes D12 to negative battery. It is noted that diodes D1 and D2 preferably provide a predetermined voltage drop, such as 4 volts for example. Diode D1, therefore, may represent a plurality of diodes in series and reversely poled diodes D2 may similarly represent a plurality of diodes in series to attain the desired voltage drop. In any event, the total drop across diodes D1, D2 and D3 is approximately 4 volts during the transmission of a marking signal. Accordingly, lead 21 is rendered approximately 4 volts positive with respect to lead 22. If remote station 2 is at this time also sending a marking signal, approximately 3 milliamps of marking current flows from lead 21 through line monitor 14 and lead 23 to output terminal L1 and returns on terminal L2, lead 24 and through line monitor 14 to lead 22. Of course, if the remote station is sending a spacing signal, the incoming spacing current overcomes the outgoing marking current, since this spacing current is provided by a source of potential at the remote station which is the reverse of the marking signal potential and approximately three times the magnitude. Accordingly, approximately 3 milliamps of spacing current flows into terminal L1 and passes via lead 23, line monitor 14, lead 21, diodes D1, D2 and D3, lead 22, and then through line monitor 14 and lead 24 to output terminal L2.

Assume now that local station 1 is sending a spacing signal. This applies a positive potential to lead 20 by terminal 10. This turns transistor Q16 ON. The collector potential of transistor Q16 drops toward ground. This turns ON transistor Q15. The collector current flows through resistors R3 and R4, raising the potential on the base of transistor Q3 to turn this latter transistor ON.

With transistor Q15 turned ON, the emitter current flows through resistor R2 and breakdown diode D5, lowering the potential on the base of transistor Q1. Accordingly, transistors Q1 and Q3 are turned ON. The collector potential of transistor Q3 now drops so that the base of transistor Q4 is no longer positive with respect to its emitter. At the same time the potential on the collector of transistor Q1 rises so that the base of transistor Q2 is no longer negative with respect to its emitter. Accordingly, transistors Q2 and Q4 turn OFF. Thus, when transmitter 12 is sending a spacing signal, transistors Q1 and Q3 are turned ON, and transistors Q2 and Q4 are turned OFF.

With transistors Q1 and Q3 turned on, a current path is provided from positive battery by way of reversely poled diodes D11, the emitter-to-collector path of transistor Q1, resistor R10, breakdown diode D3, diode D4, resistor R5, the collector-to-emitter path of transistor Q3 and reversely poled diodes D12 to negative battery.

Breakdown diode D3 is preferably arranged to break down at approximately 12 volts. Accordingly, the voltage drop across diodes D3 and D4 with transistors Q1 and Q3 turned ON is approximately 12 volts. This potential is thus applied across leads 22 and 21. It is noted that the voltage potential applied to leads 22 and 21 is reversed in polarity with respect to the marking signal and, in addition, the magnitude of the potential is approximately three times the magnitude of the marking signal. Accordingly, a spacing signal is transmitted, comprising current passed from lead 22 through line monitor 14 and lead 24 to output terminal L2. The spacing current then returns on terminal L1 and passes through lead 23 and line monitor 14 to lead 21.

It is noted that if the local station is sending a spacing signal and the remote station is sending a marking signal the locally generated spacing potential source opposes the marking potential source generated by the remote station. The spacing voltage is, however, approximately three times the potential of the marking voltage source. The resultant current on line 4 is, therefore, spacing current having a magnitude reduced by the magnitude of the opposing marking current from the remote station and thus comprising approximately 3 milliamps of current. If both stations are concurrently sending spacing signals, the two spacing voltages are in aiding relationship. Compared with the situation where one station is sending a spacing signal and the other station is sending a marking signal, it can be seen that the magnitude of the spacing current where two stations are sending spacing is approximately 9 milliamps or three times the magnitude of the spacing current developed where one station sends spacing current and the other station sends opposing marking current.

Consider now the details of line monitor 14. Line monitor 14 includes resistors R13 through R20 and diodes D6 and D7. Resistor R13 interconnects leads 21 and 23 and resistor 14 interconnects leads 22 and 24. The junction of lead 21 and resistor R13 is connected to the junction of resistor R14 and lead 24 by the series circuit comprising resistor R17, resistor R18 and diode D6 in shunt thereto and resistor R16. The junction of resistor R13 and lead 23 is connected to the junction of resistor R14 and lead 22 by the series circuit comprising resistor 15, resistor R19 and diode D7 in shunt thereto and resistor R20. It is, therefore, seen that the resistors and diodes in line monitor 14 form a bridge circuit with the junction of resistors R13 and R17 and resistors R20 and R14 forming opposing terminals connected across output leads 21 and 22 of transmitter 12. In addition, the junction of resistors R13 and R15 and the junction of resistors R14 and R16 form opposing terminals of the bridge across output leads 23 and 24, which leads, of course, extend to line 4. Output leads 25 and 26 of line monitor 14 are connected to intermediate points of opposing arms of the bridges. Specifically, lead 25 is connected to the junction of resistors R15 and R19 while lead 26 is connected to the junction of resistors R16 and R18.

Resistors R15, R16, R17 and R20 connected relatively high impedances and, in addition, have impedances equal to each other. The impedances of resistors R13 and R14 are relatively small and equal to each other. With this arrangement substantially all of the line current flows through resistors R13 and R14 and, neglecting for the present resistors R18 and R19, the impedances of the opposite arms of the bridges are equal and leads 25 and 26 are, therefore, connected to the midpoint of the opposing arms with respect to the impedances of the opposing arms. Resistors R15 and R17 or resistors R16 and R20 can therefore be alternatively viewed (as opposed to bridge arms) as impedance networks that sense the voltage drops across resistors R13 and R14 and apply the drops across leads 25 and 26. Since the impedance networks have common output terminals, they take the form of a summing network, leads 25 and 26 summing the outputs of the networks.

Assume that first that transmitter 12 of local station 1 is sending a marking signal. In this event, as previously described, lead 21 is approximately 4 volts positive with respect to lead 22. Leads 21 and 23 are positive with respect to leads 24 and 22, respectively. Current, therefore, flows in the forward direction through diodes D6 and D7 and the consequent low impedance of these diodes therefore effectively removes resistors R18 and R19 from the bridge circuit. Accordingly, when marking is being transmitted by transmitter 12 of local station 1, the impedances of the opposite arms of the bridge (or the opposite arms of each network) are equal. In this event, the potentials on leads 25 and 26 would be the same, assuming no line current is flowing through resistors R13 and R14.

With transmitter 12 sending marking, assume first that remote station 2 is also sending a marking signal. In this event, as previously described, marking current is flowing from lead 21 to lead 23 and from lead 24 to lead 22. Therefore, the potential on the junction of resistors R13 and R17 is more positive than the potential on the junction of resistors R13 and R15.

Similarly, the potential on the junction of resistors R14 and R16 is more positive than the potential on the junction of resistors R14 and R20. It is, therefore, apparent that the potential on the junction of resistors R16 and R18 is more positive than the potential on the junction of resistors R15 and R19. Thus, with marking current on the line, the potential on lead 26 is positive with respect to the potential on lead 25.

If, with transmitter 12 sending a mark signal, remote station 2 is sending a spacing signal, spacing current flows from lead 23 to lead 21 and from lead 22 to lead 24, as previously described. Accordingly, the potential on the junction of resistors R13 and R15 is more positive with respect to the potential on the junction of resistors R13 and R17 and, similarly, the potential on the junction of resistors R14 and R20 is more positive than the potential on the junction of resistors R14 and R16. Accordingly, the potential on lead 25 is positive with respect to the potential on lead 26. This indicates that an incoming spacing signal is being received.

If transmitter 12 at local station 1 is sending a spacing signal, lead 22 is approximately 12 volts positive with respect to lead 21, as previously described. Accordingly, the potential on the junction of resistors R14 and R20 is positive with respect to the potential on the junction of resistors R13 and R15 and potential on the junction of resistors R14 and R16 is positive with respect to the potential on the junction of resistors R13 and R17. Diodes D6 and D7 are thus back biased, whereby resistors R18 and R19 are inserted in the circuit. This increases the voltage drop between leads 22 and 25, to render the potential on lead 25 more negative under the situation that no line current is flowing. Similarly, the voltage drop between leads 26 and 21 is increased to render the potential on lead 26 more positive under the assumed condition that no current is flowing.

The value of the impedances are so arranged that the potentials on leads 25 and 26 are equal under the assumed condition that 6 milliamps of spacing line current is flowing through resistors R13 and R14, since under this condition the voltage drop across resistors R19 and R20 due to the incremental current flow is equal to the voltage drop across resistor R14 due to line current flow plus the voltage drop across resistor R16 due to the incremental current flow.

Assume now that remote station 2 is sending a mark signal while transmitter 12 of the local station is sending a spacing signal. As previously described, 3 milliamps of spacing current now flows through line 4. In this event, the voltage drop across resistor R14 is less than the assumed condition that 6 milliamps of spacing current flows, and, similarly, the voltage drop across resistor R13 is less. Accordingly, as compared with the condition of 6 milliamps of flowing currents, the potential on the junction of resistors R20 and R14 is less positive with respect to the potential on the junction of resistors R14 and R16 and, similarly, the potential on the junction of resistors R13 and R15 is less positive with respect to the potential on the junction of resistors R13 and R17. Accordingly, the potential on lead 26 is more positive than the potential on lead 25, indicating that remote station 2 is sending a marking signal.

When both stations are sending spacing signals, 9 milliamps of spacing current flows over line 4. This now renders the potential on the junction of resistors R14 and R20 more positive with respect to the potential on the junction of resistors R14 and R16 and, similarly, the potential on the junction of resistors R13 and R15 more positive with respect to the potential on the junction of resistors R13 and R17. Accordingly, the potential on lead 25 is made positive with respect to the potential on lead 26, indicating that remote station 2 is sending a spacing signal.

It is noted that longitudinal or ground currents on line 4 are balanced out by line monitor 14. This is evident because the ground current flow is equal and in the same direction on leads 23 and 24, i.e., the current either flows into the station or out of the station and not clockwise or counterclockwise in the manner that line signal current flows. Accordingly, the relative change in the potentials of the opposite terminals of the bridge change in the same direction and the effect of longitudinal currents are, therefore, balanced out.

Leads 25 and 26 extend, as previously described, to signal slicer 15. Lead 26 is connected to the base of transistor Q5. Lead 25 extends to the base of transistor Q6. The emitters of transistors Q5 and Q6 are connected together and to negative battery supply through a constant current generator, generally indicated by block 102. Accordingly, the transistors are arranged as a differential pair and the collectors of each are than applied to a push-pull amplifier, generally indicated by block 103. The output of push-pull amplifier 103 then extends to output lead 29. It is thus seen that signal slicer 15 is arranged as a nonlinear difference amplifier and output lead 29 follows the relative difference in potential between leads 25 and 26. Specifically, the voltage on output lead 29 is positive when the potential on lead 26 is positive with respect to the potential on lead 25. Conversely, the potential on output lead 29 is negative when the potential on lead 25 is positive with respect to the potential on lead 26. Accordingly, when line monitor 14 detects an incoming mark signal, signal slicer 15 applies a positive potential to lead 29, whereas when line monitor 14 senses an incoming spacing signal from remote station 2, signal slicer 15 applies a negative potential on lead 29. The signals on lead 29 are applied by way of low-pass filter 16 to lead 30.

Low-pass filter 16, as can be seen from the drawing, comprises a conventional filter circuit arranged to eliminate high-frequency noise and line transients. Accordingly, lead 30 has applied thereto the positive marking and negative spacing signals corresponding to the incoming marking and spacing line signals.

Lead 30 is connected to the base of transistor Q7 in signal driver 17. Positive marking signals applied to the base of transistor Q7 turn the transistor ON. A ground potential is thus applied to the collector of transistor Q7. This collector potential is passed to the base of transistor Q8. The emitter of transistor Q8 is connected via breakdown diode D9 and resistor R23 to negative battery. Transistor Q8 is arranged as an emitter-follower and the output at the junction of resistor R23 and diode D9 follows the potential on the collector of transistor Q7 less the voltage necessary to break down diode D9. Therefore, a ground marking potential on the collector of transistor Q9 develops a negative potential which is passed through resistor R26 to lead 28. This indicates that a marking signal is being received.

If a spacing signal is being received, a negative spacing potential is applied to lead 30 and thus, to the base of transistor Q7. Transistor Q7, therefore, turns OFF and positive battery is applied by way of resistor R24 to the base of transistor Q8. The positive potential is passed by emitter-follower transistor Q8 and diode D9 (reduced in potential by the voltage necessary to break down diode D9). Accordingly, a positive potential is applied through resistor R26 to lead 28 when an incoming spacing signal is being received.

The negative marking and positive spacing signals on lead 28 are applied to a select magnet driver circuit, generally indicated by block 104 in terminal 10. Select magnet driver 104 may be any conventional circuit to drive a select magnet or equivalent device which functions to provide the appropriate record of the incoming data. Accordingly, the incoming marking and spacing signals from remote station 2 are applied to select magnet driver circuit 104 and the appropriate data record is thus provided.

Although a specific embodiment of this invention has been shown and described, it will be understood that various modifications may be made without departing from the spirit of this invention.

We claim:

1. In a full duplex data set including means for transmitting direct-current signals to a communication line and means for concurrently receiving incoming direct-current signals from said line, said receiving means including a bridge circuit having at least four arms and including a first pair of diagonally opposite terminals connected across the line and a second pair of diagonally opposite terminals connected across the transmitting means and means for detecting the voltage developed across corresponding points in each arm of one pair of opposing arms of said bridge, CHARACTERIZED IN THAT said bridge circuit further includes means controlled by the signals transmitted to the line and independent of the direct-current signals on said line for modifying the impedances of said opposing arms of said bridge.

2. In a full duplex data set in accordance with claim 1 wherein said controlled means comprises a diode which effectively inserts and removes impedances in the detecting means in response to voltage biasing signals developed by the transmitting means.

3. In a full duplex data set including signal voltage transmitting means for applying current signals to a two-wire line loop and a monitor for recovering incoming signals from the cumulative signal currents on the line loop, said monitor comprising:

an impedance network means for d4veloping an output designating the magnitude and direction of current on the line loop; and means responsive to the signal voltage transmitting means and independent of the currents on the line loop for modifying the impedance of the network means to thereby modify the output for each line loop current condition.

4. In a full duplex data set in accordance with claim 3 wherein said modifying means comprises a nonlinear impedance device for effectively inserting and removing network impedances in response to signal voltage applied thereto.

5. In a full duplex data set in accordance with claim 3 wherein said impedance network comprises a first network for detecting the magnitude and direction of current on one wire of the line loop, a second network for detecting the magnitude and direction of current on the other wire of the line loop and means for algebraically combining outputs of the first and second networks.

6. In a full duplex data set in accordance with claim 5 wherein said modifying means comprises a nonlinear impedance device in each of said first and second networks for effectively inserting and removing network impedances in response to signal voltages.